4/10/84 XR 4,442,359

United States Patent [19]

Lederer

[11] 4,442,359

[45] Apr. 10, 1984

[54] MULTIPLE FIELD-OF-VIEW OPTICAL SYSTEM

[75] Inventor: David B. Lederer, Rochester, N.Y.

[73] Assignee: Detection Systems, Inc., Fairport, N.Y.

[21] Appl. No.: 353,364

[22] Filed: Mar. 1, 1982

[51] Int. Cl.³ .............................................. G01J 1/04

[52] U.S. Cl. .................................. 250/342; 250/353; 340/567

[58] Field of Search .................. 350/1.1, 1.2, 1.4, 167; 250/342, 347, 353; 340/565

[56] References Cited

U.S. PATENT DOCUMENTS

| | | | |
|---|---|---|---|
| 3,703,718 | 11/1972 | Berman | 340/567 |
| 4,185,891 | 1/1980 | Kaestner | 350/167 |
| 4,268,752 | 5/1981 | Herwig et al. | 250/353 |
| 4,275,303 | 6/1981 | Mudge | 250/342 |

FOREIGN PATENT DOCUMENTS 3028252 3/1982 Fed. Rep. of Germany ....... 350/1.1

OTHER PUBLICATIONS

R. C. Guichard "Plastic Lens Used in Photoelectric Control" *Control Engineering* vol. 29, No. 3 (Feb. 1982) pp. 134–142.

*Primary Examiner*—Janice A. Howell
*Assistant Examiner*—Constantine Hannaher
*Attorney, Agent, or Firm*—Warren W. Kurz

[57] ABSTRACT

Disclosed herein is a multiple field-of-view optical system which is adapted for use in electromagnetic radiation-responsive systems, e.g. in passive infrared intruder detection systems. The optical system features an array of optical wedges which are arranged and constructed to intercept radiation propagating toward an optical axis from a plurality of discrete fields of view and refract such radiation in a direction parallel to such axis. A reflective focusing element, preferably parabolic in shape and positioned on said axis, intercepts the radiation refracted by the wedge array and redirects it toward the reflector's focal point. According to a preferred embodiment, the reflective element and wedge array are mounted for relative movement to alter the direction of the various fields of view.

9 Claims, 7 Drawing Figures

FIG. 6
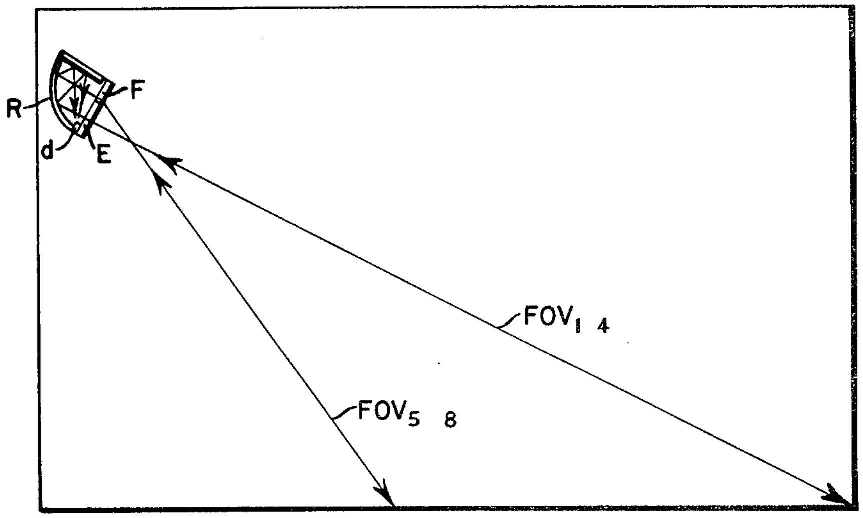
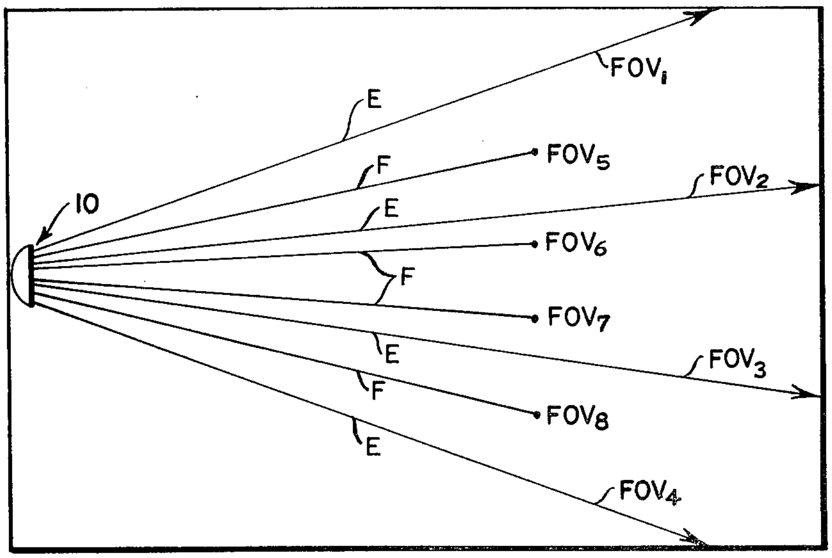
FIG. 7

MULTIPLE FIELD-OF-VIEW OPTICAL SYSTEM

BACKGROUND OF THE INVENTION

This invention relates to improvements in optical systems of the type conventionally employed, for example, in intruder detection systems of the passive infrared variety.

Conventional passive infrared intrusion detection systems typically comprise a multiple field-of-view optical system for directing infrared radiation (IR) emanating from any one of a plurality of discrete fields of view onto a single pyroelectric detector, or a closely spaced pair of such detectors. See, for example, the optical systems disclosed in U.S. Pat. No. 3,703,718 issued in the name of H. L. Berman. The optical systems disclosed in the Berman patent comprise, in general, a plurality of discrete, spherical mirror segments having a common focal point. Each mirror segment is inclined with respect to the other segments to provide an IR detector located at the common focal point with a plurality of discrete, sector-shaped fields of view. As an IR source (e.g. a human being) moves into and out of these fields of view, a sudden change in the level of IR radiation is sensed by the detector and an alarm is sounded.

Aside from being relatively costly to manufacture and difficult to optically align and maintain in focus, multi-field-of-view optical systems of the type disclosed in the Berman patent have other drawbacks when used in passive IR detection systems. For example, in installing such systems, it is often desirable to selectively mask one or more of the reflective segments to prevent a false alarm-producing source (e.g. a heating duct or light bulb) from being within one or more of the multiple fields of view. This problem could be alleviated by simply applying a masking material to the segment(s) which would otherwise focus the false alarm-providing source on the IR detector. But, owing to their non-transparent and reflective nature, these mirror segments must be positioned behind the sensor element; hence, they are not readily accessible for the purpose of applying such masking material.

Another undesirable characteristic of such multifaceted reflective optical systems is that they are typically of relatively short focal length, a property which allows the overall dimensions of the detector housing to be minimized. Unfortunately, as the focal length diminishes, the field of view of each reflector increases, which, in turn, reduces the sensitivity of the system. While it is known to optically fold reflective optical systems by the use of or additional mirrors, such additional elements are costly; moreover, they add substantial optical losses to the system.

A possible solution to the aforementioned problems with multifaceted reflective optical systems is disclosed in U.S. Pat. No. 4,275,303, issued to P. H. Mudge. Such an optical system substitutes an array of Fresnel lenses for the multiple mirror segments, each Fresnel lens being tilted with respect to the others so as to have its own discrete field of view. A refractive system such as this allows the focusing elements to be positioned in front of the detector, and thereby facilitates the task of selective masking. Moreover, such an "up front" optical system can be optically folded without incurring substantial optical loss, and allows easy substitution of one Fresnel lens array for another to achieve variations in the pattern of protection. While the Fresnel lens approach overcomes many of the disadvantages associated with the above-mentioned reflective-type optical systems, it has certain disadvantages of its own. For example, assuming the desirability of (a) being able to adjust the position of the Fresnel lens relative to the detector housing so as to alter the directions in which the several fields-of-view are aiming, and (b) having a fixed IR-transmitting window on the detector housing to prevent dust, wind currents, etc., from causing false alarms, it is necessary to use two separate IR-transmitting elements in such a system; i.e., a movable Fresnel lens and a fixed exterior window. This requirement, of course, adds to the system cost and introduces optical losses which adversely affect sensitivity. Still nother drawback of such Fresnel systems is that each lens element must be precisely positioned and angularly disposed with respect to the other lens elements so as to share a common focal point. In this regard, they are no easier to align and maintain in focus than the aforementioned reflective optical systems. Moreover, should it be desirable to substitute one lens array for another (e.g. to eliminate a damaged lens or to alter the pattern of the fields of view), it is necessary to realign and refocus the entire optical system.

SUMMARY OF THE INVENTION

In view of the foregoing discussion, it can be appreciated that an object of this invention is to provide an improved, low cost, low optical loss multi-field-of-view optical system in which the optical elements defining each field of view are relatively easy to optically align (so as to share a common focal point) and maintain in focus.

Another object of this invention is to provide a relatively long focal length, multiple field-of-view optical system which can be packaged into a relatively flat housing.

Still another object of this invention is to provide a multiple field of view optical system which is readily adapted to have one or more fields of view rendered ineffective and to have the pattern of such fields alterable without disturbing the focus of the system.

Yet another object of this invention is to minimize the number of radiation-transmissive elements in a multiple field-of-view optical system of the type used in passive IR intruder detection.

The above and other objects of the invention are achieved by an optical system which comprises (a) an array of optical wedges which are positioned to intercept radiation propagating toward an optical axis from different directions and to refract such radiation in a direction substantially parallel to such optical axis and (b) a reflective focusing element, preferably parabolic in shape, which is disposed on such optical axis to intercept radiation refracted by the optical wedges and direct such radiation to its focal point.

The invention and its various technical advantages will become apparent to those skilled in the art from the ensuing description, reference being made to the following drawings.

BRIEF DESCRIPTION OF THE DRAWINGS

FIGS. 6 and 7 are side and top views of a room showing the directions of the fields of view of an optical system employing a segmented array of optical wedges of the type shown in FIG. 5.

DETAILED DESCRIPTION OF PREFERRED EMBODIMENTS

Figure 1:
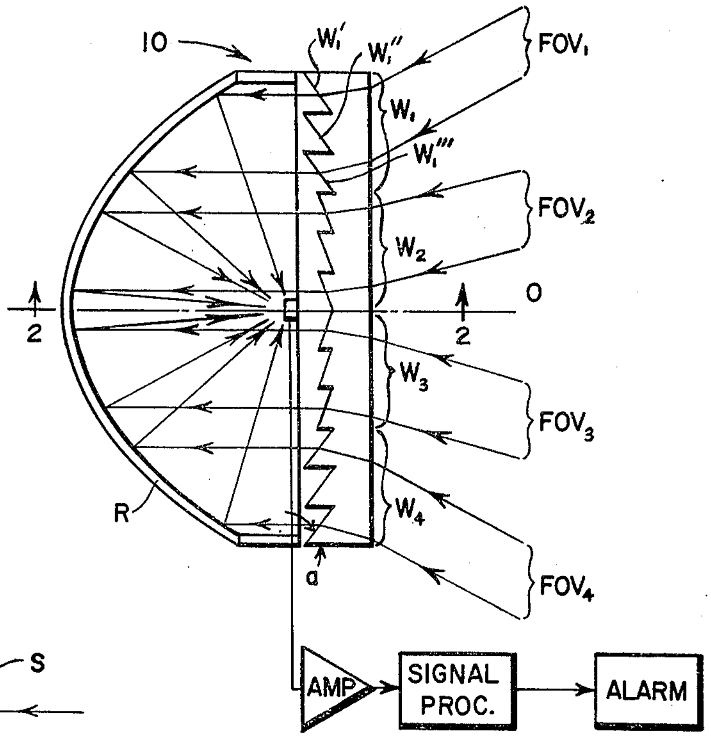
FIG. 1 is a schematic illustration of a passive infrared radiation detection system including a multi-field-of-view optical system structured in accordance with a preferred embodiment of the invention.

Referring now to the drawings, and particularly to FIGS. 1-4, there is shown a multiple-field-of-view optical system 10, structured according to a preferred embodiment of the invention. Such an optical system is shown in FIG. 1 as incorporated in a conventional passive infrared radiation (IR) detection system. Such a detection system includes an IR-responsive detector D upon which the optical system focuses radiation emanating in a plurality of fields of view $FOV_1$-$FOV_4$. The output of detector D is amplified and coupled to a signal processing circuit which activates an alarm in the event the detector output varies in a predetermined manner.

The optical system of the invention basically comprises a reflective focusing element R having an optical axis O, and an array A of optical wedges $W_1$-$W_4$. The latter serves to refract radiation approaching optical axis O from four different directions (i.e. from fields of view $FOV_1$-$FOV_4$) so that, upon being refracted, such radiation travels in a direction parallel to axis O. The reflective element R, which is preferably a segment of parabolic reflector, is arranged to intercept the radiation refracted by the optical wedges and to redirect it toward detector D located at the focal point of the reflective element. To reduce the length of the optical system and thereby minimize the size of its supporting housing, it is preferred that a plane mirror M be employed to optically fold the system. The positions and effect of the reflective element R and plane mirror M are best shown in FIGS. 2 and 3.

To minimize the weight and thickness of the array of optical wedges, the wedges $W_1$-$W_4$ are preferably formed, in a Fresnel lens-like manner, in a thin sheet S of transparent material which, in an IR system, preferably comprises polyethylene. As shown in FIGS. 1 and 3, each wedge is made up of a plurality of prismatic elements (e.g. $W_1'$, $W_1''$, $W_1'''$), each being identical in shape and having no optical power. Of course, each wedge may comprise a much larger number of prismatic elements than shown. When made of an IR-transmitting plastic, the Fresnel optical wedge component can be manufactured by conventional molding techniques.

Figure 2:
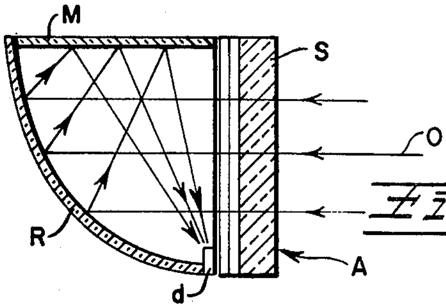
FIG. 2 is a side cross-sectional view of the optical system shown in FIG. 1 taken along the section line 2—2.
Figure 3:
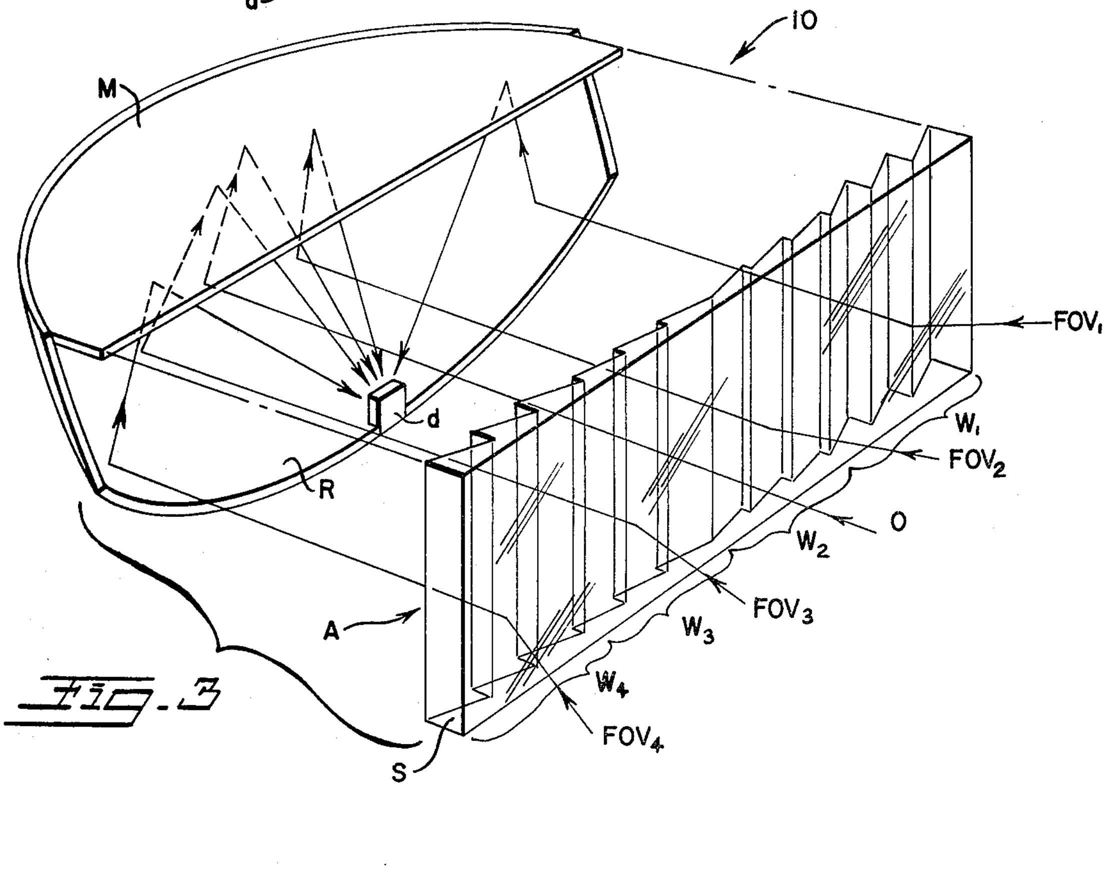
FIG. 3 is an exploded perspective view of the optical system shown in FIGS. 1 and 2.
Figure 4:
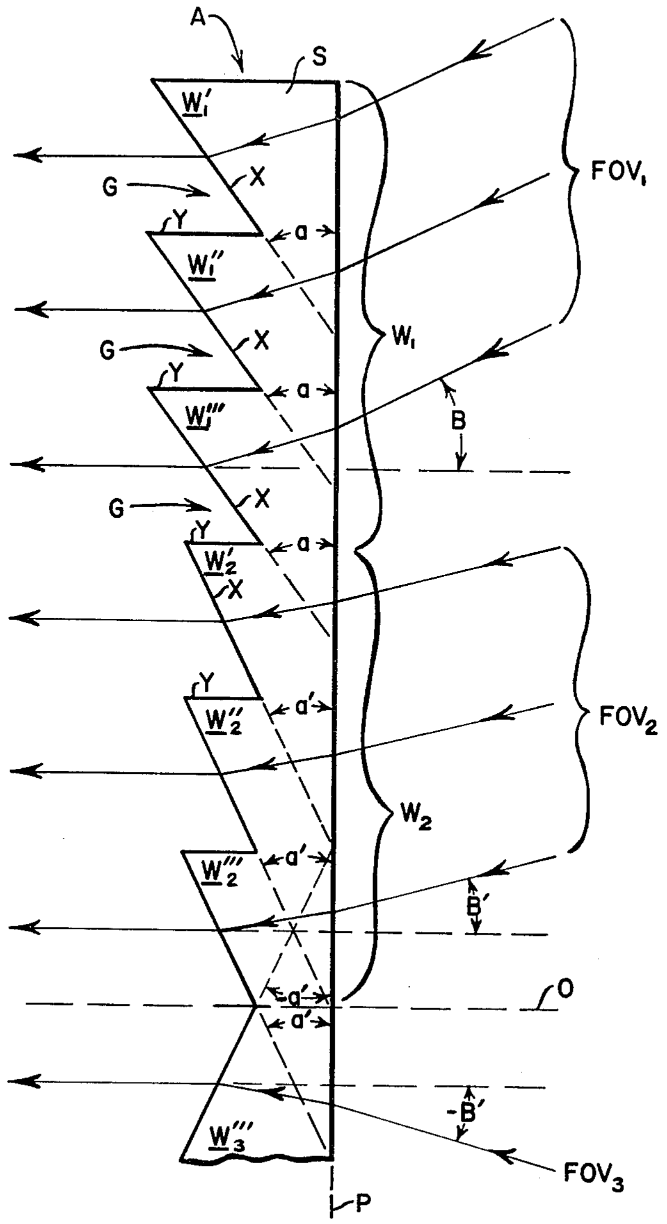
FIG. 4 is an enlarged cross-sectional view of a portion of the optical system shown in FIGS. 1-3.

Referring to FIG. 4, there is shown an enlarged diagramatic cross-section of a portion of the wedge array A shown in FIGS. 1-3. As shown, the individual prismatic elements (e.g. $W_1'$, $W_1''$, $W_1'''$) of an optical wedge sector are formed by a plurality of parallel, rectilinear grooves G cut or molded in the sheet S of transparent material. Each of such grooves is formed by a pair of converging and intersecting planar surfaces X, Y. Preferably, each of the Y surfaces extends in a direction which is substantially parallel to the optical axis O in order to prevent radiation outside the desired fields-of-view of the optical system from reaching the system's focal point via multiple internal reflections. The X surfaces are inclined relative to the optical axis O and an extension thereof (shown in dashed lines) intersects with the plane P of sheet S to define the apex angle a of each prismatic element. Together with the refractive index of the sheet material, it is this apex angle which determines the angular displacement (e.g. B, B') of each field of view relative to the optical axis. It will be noted that the apex angle a of the prismatic elements $W_1'$, $W_1''$, $W_1'''$ differs from the apex angle a' of elements $W_2'$, $W_2''$ and W; hence, the angles B and B' of their respective fields of view differ. Also, though the absolute magnitudes of the apex angles of the $W_2$ and $W_3$ elements (as well as the $W_1$ and $W_4$ elements) are the same in the drawings, these elements provide different fields of view because their respective orientations are opposite or inverse, this being denoted by the minus sign on the apex angle (i.e. −a) of the prismatic element $W_3'''$.

Figure 5:
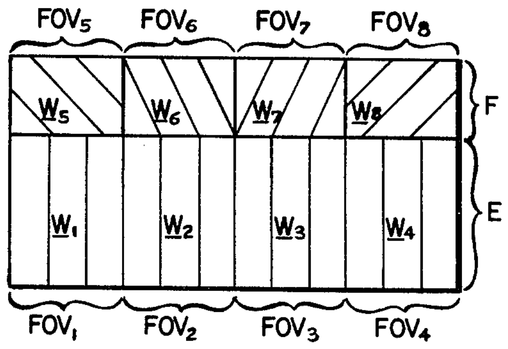
FIG. 5 is a front view of an array of optical wedges which is structured in accordance with an alternative embodiment.

In FIG. 5 there is shown an alternate form of the optical system of the invention. In this embodiment, the array of optical wedges is divided into two sections E and F. The optical wedges $W_1$-$W_4$ of section E are arranged as discussed above with reference to FIGS. 1-3; i.e. all of the grooves which define the prismatic elements of such optical wedges extend in the same direction. The respective grooves which define the prismatic elements of optical wedges $W_5$-$W_8$ of section F, however, are angularly disposed with respect to the grooves of wedges $W_1$-$W_4$, as well as to each other, so that their respective fields of view are as shown in FIGS. 6 and 7. It will be appreciated that when the orientation of an optical wedge is rotated, the field of view it provides transcribed a circular path. Thus, by proper selection of the apex angle of an optical wedge, its orientation (with respect to the vertical) and its refractive index, the field of view provided by such wedge can be directed in any desired location.

Referring to FIG. 5, it will be noted that those optical wedges of the F section of the array have fields of view that intersect the floor of a room, in which the optical system is used, at positions which are closer to the optical system than those positions at which the optical wedges of the E section intercept such floor. It should also be observed that rays which are refracted by the F section of the array strike the upper portion of the parabolic reflector and traverse a shorter path to the detector D than those rays which pass through the E section. This is a desirable feature of this embodiment in that the image size of the detector projected into the fields of view $FOV_1$-$FOV_4$ can be made to be approximately the same as that projected into $FOV_5$-$FOV_8$. Having the same image size in both near and far fields simplifies the frequency response of the detector's signal processing circuit.

The advantages of the optical system of the invention are many. For example, since the optical wedge element has no optical power, it can be removed (e.g. for cleaning), and replaced without disturbing the focus of the system. Further, since each optical wedge functions only to refract incident light so that it exits parallel to the optical axis, sheet S can be planar; i.e., the plane of each of the wedges can be common. A planar configuration, of course, facilitates the assembly of the optical system. Further, to change the directions in which the various fields of view are pointing without disturbing the intended position of optical system's housing on a wall, the position of the parabolic reflector can be pivoted about either a vertical axis passing through its focal point, or about a horizontal axis which is normal to the optical axis O. By allowing sheet S to remain stationary relative to the housing, it can function additionally as a dust sealing member, thereby obviating the need for such a member and eliminating its related optical losses. As an alternate method of varying the pattern of coverage provided by a given optical wedge array, such array could be pivotally mounted for movement about vertical and/or horizontal axes, or another wedge array of different refractive index and/or apex angles could be substituted; there would be no need to refocus following such a substitution. Still another advantage over reflective type multiple field-of-view optical systems is that selective masking of any field of view can be achieved by merely applying a masking material over any one of the readily accessible optical wedges. There is no need to delve into the bowels of the system to effect such masking.

While the invention has been disclosed with particular reference to infrared radiation, it is to be understood that the wavelength of radiation acted upon by the optical system of the invention is not critical; obviously, it can be used to refract visible and ultraviolet rdiation as well. Moreover, preferred embodiments, it will be appreciated that modifications can be made to the apparatus of the invention without departing from the spirit and scope of the invention as defined by the following claims.

I claim:

1. For use in an electromagnetic radiation-responsive detection system of the type comprising a radiation-responsive detector disposed on an optical axis, an optical system for concentrating radiation onto the detector from each of a plurality of discrete fields of view, said optical system comprising:

an array of optical wedges, each wedge being adapted to intercept radiation propagating toward said optical axis at a unique angle and to refract such radiation in a direction substantially parallel to said optical axis and toward said detector; and a reflective focusing element disposed on said optical axis between said optical wedge array and said detector to focus radiation refracted by each of said wedges onto said detector.

2. The invention according to claim 1 wherein said reflector element is parabolic in shape.

3. The invention according to claim 1 wherein said array of optical wedges comprises a substantially planar sheet of radiation-transmitting material having a plurality of sets of rectilinear grooves of triangular transverse cross-section formed therein, the grooves of each set being parallel to each other and defining prismatic elements having substantially identical apex angles, such apex angles differing in magnitude and/or sense from the apex angles of the prismatic elements defined by the grooves of other sets.

4. The invention according to claim 3 wherein the grooves of each of said sets are parallel to the grooves of all other sets.

5. The invention according to claim 3 wherein the grooves of at least one of said sets are angularly disposed with respect to the grooves of another of said sets.

6. The invention according to claim 3 wherein each of said grooves is defined by a pair of converging flat surfaces, and wherein one of said surfaces extends perpendicular to the plane of said sheet.

7. The invention according to claim 3 wherein said material comprises polyethylene.

8. The invention according to claim 1 wherein said array of optical wedges and said reflector element are mounted for relative movement with respect to each other.

9. The invention according to claim 1 further comprising a second reflective element positioned in the optical path between said reflective focusing element and the detector to fold the optical path between the reflective focusing element and the detector.

* * * * *